United States Patent

[11] 3,572,918

| [72] | Inventor | Kurt Steisslinger |
| | | Stuttgart-Wangen, Germany |
| [21] | Appl. No. | 755,322 |
| [22] | Filed | Aug. 26, 1968 |
| [45] | Patented | Mar. 30, 1971 |
| [73] | Assignee | Eastman Kodak Company |
| | | Rochester, N.Y. |
| [32] | Priority | Sept. 1, 1967 |
| [33] | | Germany |
| [31] | | K63253 |

[54] FILM GUIDE CHANNEL FOR SPROCKETLESS CINEMATOGRAPHIC DEVICE
5 Claims, 5 Drawing Figs.

[52] U.S. Cl. .................................................... 352/224,
226/198, 352/227
[51] Int. Cl. ...................................................... G03b 1/44,
G03b 1/48, B65h 23/02

[50] Field of Search ........................................... 352/221,
224, 227; 242/205; 226/198

[56] References Cited
UNITED STATES PATENTS
3,129,633  4/1964  Mees .............................. 352/224
3,136,209  6/1964  Briskin et al. .................. 352/224X

*Primary Examiner*—Louis R. Prince
*Assistant Examiner*—Frederick Shoon
*Attorneys*—Robert W. Hampton and J. Addison Mathews

ABSTRACT: A film guide channel at the projection gate of a sprocketless motion picture projector or the like includes a film-aligning pressure member which releases its pressure from the trailing end of the film after the trailing end passes the pulldown claw to facilitate automatic withdrawal of the trailing end from the gate.

FILM GUIDE CHANNEL FOR SPROCKETLESS CINEMATOGRAPHIC DEVICE

BACKGROUND OF THE INVENTION

This invention relates to a guide channel for strip material and, more specifically, to a film pressure means in a film guide channel at the gate in a cinematographic device.

It is well known in the motion picture art to provide the film path of projectors and cameras with guides at the film gate to align and prevent lateral displacement of the film in the gate area. One such guide, for example, includes a stationary aligning stop adjacent the film path along one edge of the film, and a spring-biased holding member adjacent the film path along the other edge of the film. The holding member comprises two arms of equal length which support two spaced pressure portions or pads and which may be laterally displaced or pivoted at the center of the member to urge the film against the aligning stop. In order to facilitate automatic threading, the holding member may further be provided with a spring means, as disclosed in Mees' U.S. Pat. No. 3,129,633, which pivots the holding member to withdraw the upper pressure portion, located above the pulldown claw from the film path until the film is positively engaged by the pulldown claw.

Such previously known pressure members have generally been satisfactory to align and prevent lateral displacement of the film in the gate area, and in certain cases to permit automatic threading of the film. However, previously known devices suffer, for example, from the fact that they maintain their pressure on the trailing end of the film even after the trailing end has advanced past the pulldown claw.

In sprocketless projectors, such as the projector generally illustrated and described in commonly assigned U.S. Pat. No. 3,310,251, issued Mar. 21, 1967 in the name of Robert B. Johnson, the film is advanced through the projector almost entirely in response to motion of the pulldown claw. The supply and takeup reels rotate respectively in directions to wind film onto the reels under the influence of a tendency drive which may not have sufficient force to pull the film through or out of the gate against the resistance of film aligning pressure means in the gate. Thus, once the trailing end of the film is advanced beyond the pulldown claw, the trailing end may remain trapped in the gate and may have to be manually withdrawn.

SUMMARY OF THE INVENTION

It is an object of the present invention to provide a film pressure means at the gate of a sprocketless cinematographic device (such as a motion picture projector or camera) which releases its pressure on the film after the trailing film end advances beyond the pulldown claw in a direction toward the takeup reel, thereby facilitating automatic withdrawal of the film from the gate in response to rotation of the takeup reel. It is also an object of the present invention to provide an improved pressure means which facilitates automatic threading of film into operative engagement with a pulldown claw.

In accordance with a preferred embodiment of the invention, a pressure means in the form of an elongated arm or lever is mounted on a motion picture projector and has first and second pressure portions or pads biased toward the film path to engage the film adjacent (or before) and after the pulldown claw. The lever has first and second arms of different length which are associated, respectively, with the first and second pressure pads and which are biased to withdraw the lower pressure pad from the film path in response to advance of the trailing end of the film beyond the pulldown claw, thereby to release the pressure exerted on the film by the pressure means and to facilitate automatic withdrawal of the film from the gate.

DETAILED DESCRIPTION OF PREFERRED EMBODIMENT

Figure 2:
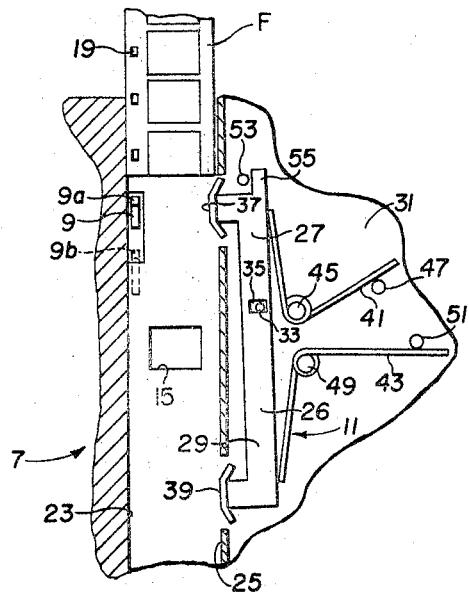
FIG. 2 is a fragmentary view in partial section of the motion picture projector depicted in FIG. 1 showing the film gate and a film pressure means in accordance with the present invention with the leading end of the film about to enter the area of the gate above the pressure means and pulldown claw.

Referring to the drawings, a preferred embodiment of the invention is illustrated, in connection with a sprocketless motion picture projector having a projector housing 1, supply and takeup reels 3 and 5, respectively, a projection gate 7, a film advancing means comprising a pulldown claw 9, and a film-aligning pressure means comprising a member 11 (FIG. 2) for aligning the film and preventing lateral displacement of the film in the gate 7. Because motion picture projectors of the type disclosed herein are well known, only these parts necessary for an understanding of the present invention will be described in detail.

Figure 1:
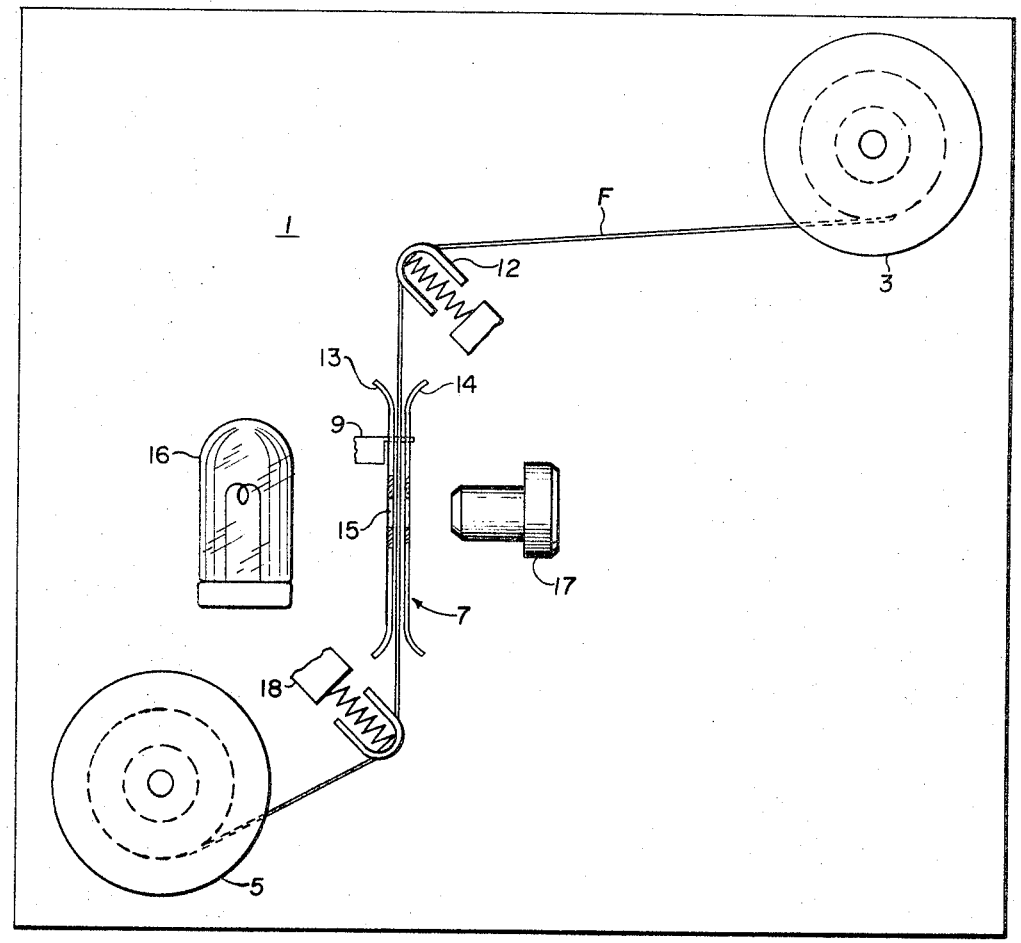
FIG. 1 is a schematic view of a motion picture projector illustrating the general features thereof including the supply and takeup reels and the projection gate area.

Referring in particular to FIG. 1, the film F is shown schematically in the threading path it would follow during an operative cycle of the projector. After being withdrawn from the supply reel 3 the film passes around a mechanical filter or snubber 12 which compensates for tension effects on the film resulting from inertia of the supply reel and intermittent movement of the pulldown claw. From the snubber 12, the film passes to the projection gate 7, which is provided with side plates 13 and 14, where the image on the film is projected through an aperture 15 by a lamp 16 and a lens 17. Thereafter, the film continues over a second mechanical filter or snubber 18 and onto takeup reel 5. The supply reel 3 and the takeup reel 5 may be rotated, respectively, in directions to wind film onto the reels by a tendency drive, which applies sufficient torque to wind the film onto the reels but not necessarily sufficient to pull the film in either direction through the gate against the friction of the film-aligning pressure means 11 in the gate. Therefore, the film is advanced through the projector primarily by the pulldown claw which intermittently advances the film through the gate in a stepwise frame-by-frame manner. The film advance at the gate in turn pulls the film from the supply reel against the action of the tendency drive, while the excess slack in the film path beyond the gate is taken up by the tendency drive of the takeup reel.

While the film advancing means or pulldown claw 9 may be selected from numerous such means known to those skilled in the art, it has been illustrated herein as a single-tooth member mounted for movement between an upper position 9a (FIG. 2) and a lower position 9b (FIG. 2). During a normal operative cycle of the sprocketless projector, the claw moves into the film path in the upper position 9a of the claw and enters perforations 19 in the film. The claw then moves to the lower position 9b to advance the film past aperture 21 and is withdrawn from the film path and perforations 19 for the return stroke. The distance between positions 9a and 9b of the claw is substantially equal to the distance between frames on the film F which is thus intermittently advanced frame-by-frame through the gate and past aperture 13.

Referring now in more detail to the present invention and to FIGS. 2—5, the film F is guided through the projector in the area of gate 7 by stationary guides or rails 23 and 25 provided along the film path adjacent the edges of the film in the gate respectively. Guide or rail 23 is adapted to accurately locate or align one edge of the film relative to aperture 13, while guide 25 effects only an initial guiding of the film until it is engaged and more accurately located by pressure member 11, as will be described more fully hereinafter.

Pressure member 11 comprises a lever or bar 26 which includes two arms 27 and 29 and which is displaceably and pivotally mounted on the projector support structure or wall 31 by a stud 33 on the projector wall and a groove or slot 35 in the pressure member 11. The member 11 can either slide on the stud for displacement toward or away from the film path or it can pivot about the stud to properly engage the film and for other purposes described more fully hereinafter. On each arm 27 and 29 and at opposite ends of lever 26, are pressure portions or pads 37 and 39 which are adapted to engage the film F adjacent and below the pulldown claw to urge the film F against guiding edge 23. For reasons set forth more fully below, arm 27 is shorter than arm 29, and the two arms are resiliently biased into the film path and against the film by two bent-wire springs 41 and 43, respectively, which differ in spring force or resiliency. The stronger spring 41 is supported on the projector by studs 45 and 47 and acts on the shorter arm 27 of pressure lever 26, while the weaker spring 43 is supported by studs 49 and 51 and acts on longer arm 29. In order to prevent extreme movement of the upper arm into the film path under the action of stronger spring 41, a lug 53 on projector wall 31 cooperates with a pin 55 on lever 26 to limit the pivotal movement of the lever.

Referring now to the operation of the film guide and pressure member, the respective parts thereof are illustrated in four operative positions in FIGS. 1—4 corresponding to four stages in the operative cycle of the projector. In the first stage, as depicted in FIG. 1, and prior to engagement of the upper pressure pad 27 by the leading end of the film during threading of the projector, the pressure lever 26 is displaced toward the film path on stud 33 and is pivoted about the stud in a counterclockwise direction under the bias of the stronger spring 41, until the finger 55 on the lever arm engages the lug 53 on the projector wall. In this position of the lever arm, the upper pressure pad 37 projects into the film path to a position where it will be engaged by the film, while the lower pressure pad 39 is retracted or withdrawn from the film path.

Figure 3:
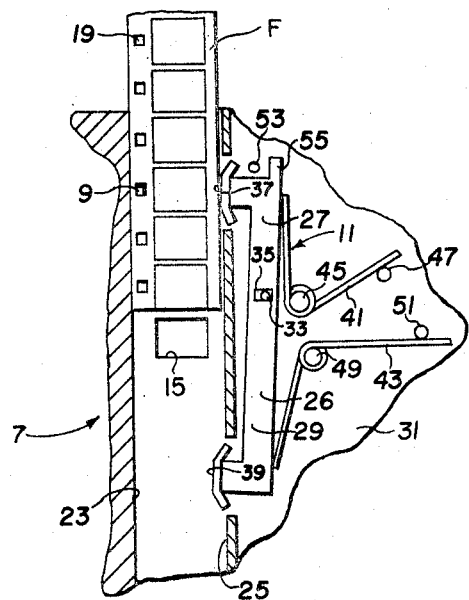
FIG. 3 is a view similar to FIG. 2 showing the leading portion of the film engaged by the pulldown claw and the upper pressure pad.
Figure 5:
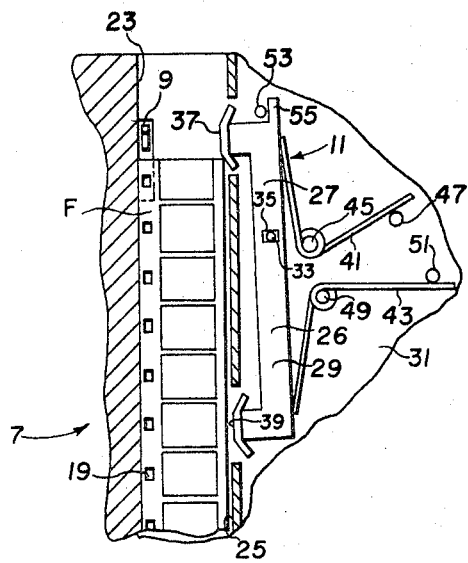
FIG. 5 is a sectional view similar to FIG. 2 with the trailing end of the film advanced along the film path beyond the upper pressure pad and pulldown claw in a direction toward the takeup reel.

As the film advances along the film path toward the gate aperture, it will engage the upper pressure pad 37, and will pivot lever arm 26 in a clockwise direction to the position shown in FIG. 2. In this position of the lever arm, the upper pad resiliently engages the film along one edge of the film path above the projection aperture and the lower pad 39 projects into the film path below the projection aperture. As the film continues to advance along the film path, the film will be engaged by the claw 9 as shown in FIG. 3, and the claw will then become effective to advance the film through the projector as described hereinbefore.

Figure 4:
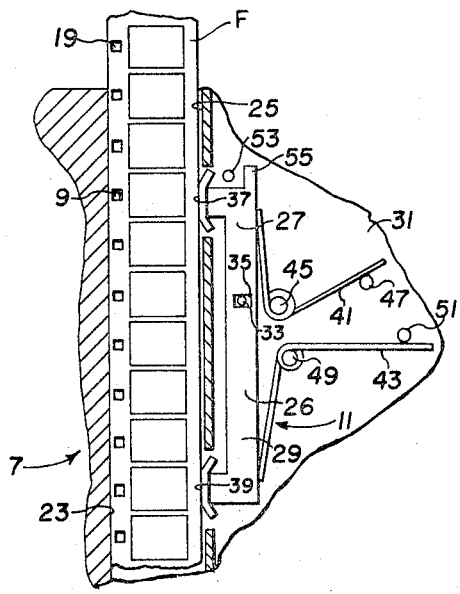
FIG. 4 is a view similar to FIG. 2 showing the film engaged by the claw and both the upper and lower pressure pads.

Upon further advance of the film along the film path, the film will engage the lower pressure pad 39, and will swing pressure lever 26 in a counterclockwise direction about stud 33 until both pads 37 and 39 resiliently engage the film along one edge of the film path as depicted in FIG. 4. In this position of the pressure lever, the film will be accurately guided and located relative to the projection gate by the locating rail or stop 23 and the resilient bias of the pads before and after the gate.

Upon completion of the projection cycle, the trailing end of the film will be advanced by the claw 9 until it is below the upper pressure pad 37 and also below the effective range of the claw. At this time, depicted in FIG. 4, the pressure lever 26 will be pivoted about stud 33 by the stronger spring 41 until the finger 55 on the lever engages the lug 53 on the projector. In this position, the lower pressure pad 39 is retracted or withdrawn from the film path and from engagement with the film, thus releasing all pressure or resistance exerted on the film by the pressure lever and permitting withdrawal of the film from the gate in response to rotation of the takeup reel.

It should now be apparent that the lower pressure portion 39, located beyond the film advancing means in the direction of film advance, is biased into or out of the film path in response to the presence or absence of film respectively at a location where the film will be engaged by the film advancing means, thus facilitating the withdrawal of the film from the gate after the trailing end advances beyond the film advancing means.

While a preferred embodiment has been described above, the resilient bias acting on the pressure lever could also be effected, for example, by a single spring, and the arms of the pressure lever could be of equal length or of some other suitable construction. Moreover, sideplates 13 and 14 or other pressure means also could be rendered ineffective as a function of the pivotal movement of the pressure lever 26.

The invention has been described in detail with particular reference to preferred embodiments thereof, but it will be understood that variations and modifications can be effected within the spirit and scope of the invention as described hereinabove and as defined in the appended claims.

I claim:

1. Film guide means for a sprocketless cinematographic device having a film path, a film gate in the film path, and means for engaging the film at a location in the gate to intermittently effect movement of the film through the gate and along the film path in a film advancing direction, the film guide means comprising:

means in the gate adjacent one side of the film path adapted to be engaged by the film for locating the film relative to the gate in a direction normal to the film advancing direction;

pressure means in the gate having a portion adjacent the opposite side of the film path movable into engagement with the film at a location along the film path beyond the film advancing means in the film advancing direction; and means for biasing said portion of the pressure means (1) into the film path and toward said locating means in response to the presence of film in a location where the film will be engaged by the film advancing means and (2) out of the film path and away from said locating means in response to the absence of film at the location where the film will be engaged by the film advancing means, thereby to bias the film toward the locating means when the film is being advanced through the gate by the film advancing means and to release the bias on the film after the film passes the film advancing means in the film advancing direction.

2. Film guide means for guiding film having two edges in a sprocketless cinematographic device, the device including means defining a film path having two edges, a gate in the film path having first and second opposed side plates and defining an aperture, and film advancing means for engaging and intermittently advancing the film in a film advancing direction along the film path and past the aperture, said guide means comprising:

means in the gate adjacent one edge of the film path and adapted to be engaged by one edge of the film to locate the edge relative to the aperture;

resilient means in the gate adjacent the other edge of the film path and having a portion adapted to engage the other edge of the film at a location beyond the film advancing means in the film advancing direction; and means for biasing said portion of the resilient means into the film path when the film is in a position to be engaged by the film advancing means and out of the film path when the film is not in a position to be engaged by the film advancing means, thereby to bias the film toward the locating means when the film is being advanced through the gate by the film advancing means and to release the bias on the film after the film passes beyond the film advancing means in the film advancing direction.

3. A film guide channel for guiding film having two edges in a sprocketless cinematographic device including a gate defining a portion of a film path having two edges and a film advancing means for engaging and intermittently advancing the film through the gate in a film advancing direction, the film guide channel comprising:

first means in the gate defining one edge of the film path and adapted to be engaged by one edge of the film to locate the edge relative to the gate;

second means in the gate positioned adjacent the other edge of the film path, having a first pressure portion adapted to engage the other edge of the film at a location adjacent the film advancing means and a second pressure portion adapted to engage the other edge of the film at a location below the film advancing means in the film advancing direction; and means responsive to the presence of film adjacent the film advancing means for biasing said first and second pressure portions into the film path when the film is in a position to be engaged by the film advancing means and for biasing said first pressure portion into the film path and said second pressure portion out of the film path when the film is not in a position to be engaged by the film advancing means, thereby facilitating withdrawal of the film from the gate after the film is advanced beyond the film advancing means along the film path in the film advancing direction.

4. A film guide channel in a sprocketless cinematographic device including a gate defining a film path having two edges and a film advancing means for engaging and intermittently advancing film having two edges in a film advancing direction through the gate, comprising:

means in the gate defining one edge of the film path and adapted to be engaged by one edge of the film for locating the edge relative to the gate;

a pressure member mounted on the device for displacement toward the locating means and for pivotal movement with respect to the locating means and having first and second spaced pressure portions adapted to engage the other edge of the film, respectively, at locations adjacent the film advancing means and below the film advancing means in the film advancing direction;

said pressure member being movable to a first position wherein said first and second pressure portions project into the film path to engage the other edge of the film and a second position wherein said first pressure portion projects into the film path and said second pressure portion is withdrawn from the film path; and means for moving said pressure member toward the first position to urge the film toward said locating means in response to movement of the film to a position where it will be engaged by the film advancing means to align the film in the gate and for moving said member toward said second position in response to movement of the film beyond the position where it will be engaged by the film advancing means, thereby facilitating withdrawal of the film from the gate after the film is advanced along the film path beyond the film advancing means in the film advancing direction.

5. A motion picture projector, comprising:

supply and takeup reels rotatably mounted on the projector;

means defining a film path between said supply and takeup reels and including a projection gate;

film advancing means engageable with film for advancing the film relative to the gate;

pressure means in the gate and having (1) a first condition wherein the pressure means is positioned with respect to film in the gate to engage the film to locate the film relative to the gate and (2) a second condition wherein the pressure means is positioned with respect to film in the gate so that the film is substantially freely movable relative to said pressure means;

means for respectively rotating said supply and takeup reels in directions to wind film thereon, said rotating means being operative to exert a force on film in the gate that is (1) sufficient to pull film through the gate when said pressure means is in its second condition but (2) is insufficient to pull film through the gate when said pressure means is in its first condition; and means for moving said pressure means to its first condition when the film is in a position to be engaged by the film advancing means and to its second condition when the film is not in a position to be engaged by the film advancing means.